(No Model.)
J. BAKER.
NUT LOCK.
No. 347,764. Patented Aug. 24, 1886.
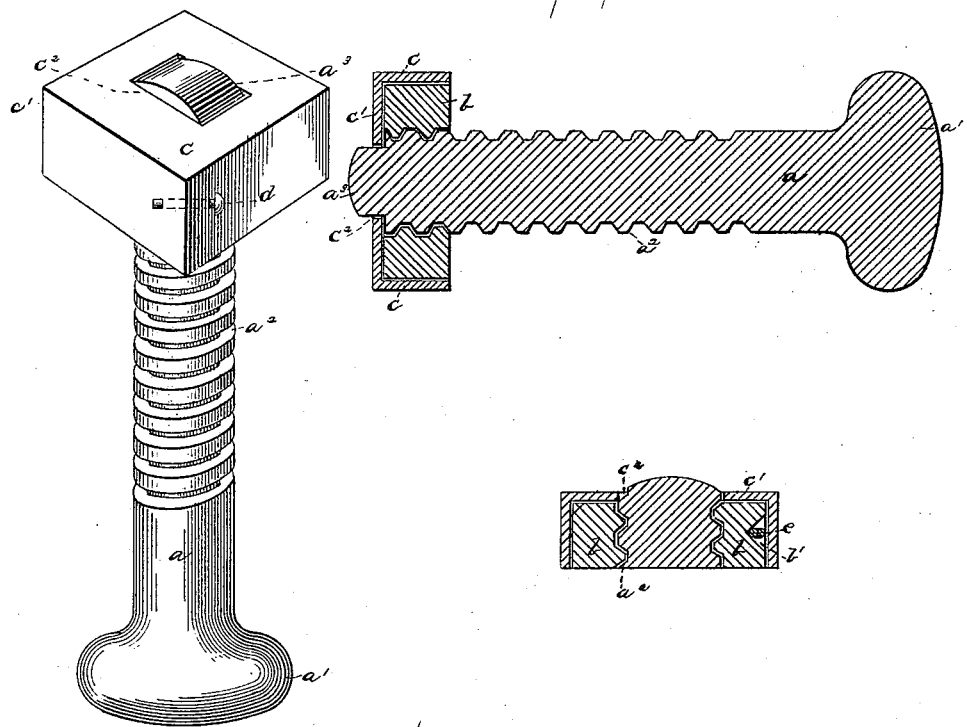
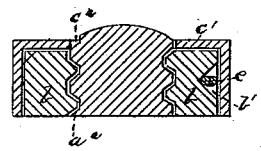
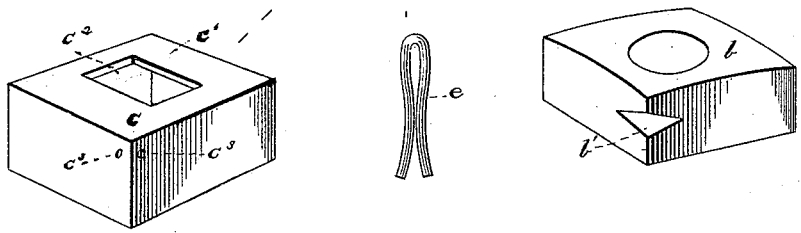
Witnesses
Geo. Thorpe,
E. G. Siggers
Inventor
John Baker
By his Attorneys

UNITED STATES PATENT OFFICE.

JOHN BAKER, OF HILLSIDE, DAKOTA TERRITORY.

NUT-LOCK.

SPECIFICATION forming part of Letters Patent No. 347,764, dated August 24, 1886.

Application filed July 9, 1886. Serial No. 207,585. (No model.)

*To all whom it may concern:*

Be it known that I, JOHN BAKER, a citizen of the United States, residing at Hillside, in the county of Douglas and Territory of Dakota, have invented a new and useful Improvement in Nut-Locks, of which the following is a specification.

My invention relates to locks for securing nuts upon bolts, and the object of the invention is to provide a simple and secure nut-lock, which may be readily applied to any nut and bolt, and which may lock the nut either permanently or temporarily.

To the above purpose my invention consists in the peculiar and novel features of construction and arrangement, hereinafter described and claimed.

In order that my invention may be fully understood, I will proceed to describe it with reference to the accompanying drawings, in which—

Figure 1 is a perspective view of my improved nut-lock. Fig. 2 is a central longitudinal section through the bolt and lock. Fig. 3 shows the several parts of the device detached from each other.

In the said drawings, $a$ designates the bolt, having a head, $a'$, and thread $a^2$, and $b$ designates the nut, which screws upon the thread $a^2$. The bolt and nut may be of the usual or any preferred form, as my improved lock is applicable to other than the precise form shown.

$c$ designates a sleeve, which may be either square, as shown, or polyangular, and $c'$ designates the closed outer end of the same. This portion $c'$ is formed with a square or angular aperture, $c^2$, as shown. At the front end of the sleeve $c$ are formed two holes, $c^3\ c^3$, located on opposite sides of one of the angles of said sleeve, and designed to receive either a rivet, $d$, or a split key, $e$.

In using this nut-lock, the threaded end $a^2$ of the bolt is partially reduced, as at $a^3$, by pressure or filing, so as to correspond with the aperture $c^2$ of the sleeve $c$. A notch, $b'$, is cut across one of the angles of the nut $b$, or, in certain forms of nuts, a hole would be substituted for the notch. The nut having been screwed home, the sleeve C is applied to the bolt, so that its reduced portion $a^3$ shall enter the aperture $c^2$ of the sleeve, and so, also, that the holes $c^3\ c^3$ shall lie in alignment with the hole or notch $b'$ of the nut. If the nut is to be permanently locked, the rivet $d$ is inserted through the holes $c^3$ and into the notch or hole $b'$, and is clinched or upset against the sleeve, while if the nut is to be only temporarily locked the split key $e$ is used and clinched in the usual manner.

The sleeve $c$ is to be preferably of malleable iron, and will be constructed in various sizes and different lengths in each size, to meet all requirements.

Having thus described my invention, what I claim as new, and desire to secure by Letters Patent, is—

The combination, with bolt $a$, having angular reduced portion $a^3$, and the nut $b$, having notch $b'$, of the angular sleeve having angular aperture $c^2$ in its end $c'$, and holes $c^3$, and the locking-pin extending through said holes, substantially as set forth.

In testimony that I claim the foregoing as my own I have hereto affixed my signature in presence of two witnesses.

JOHN BAKER.

Witnesses:
HARRY THOMPSON,
N. A. DILLMAN.